(12) United States Patent
Zeygerman et al.

(10) Patent No.: US 7,767,932 B2
(45) Date of Patent: Aug. 3, 2010

(54) HIGH DYNAMICS LASER PROCESSING MACHINE

(75) Inventors: Leonid Zeygerman, West Hartford, CT (US); Friedrich Kilian, Leonberg/Gebersheim (DE)

(73) Assignee: Trumpf, Inc., Farmington, CT (US)

( * ) Notice: Subject to any disclaimer, the term of this patent is extended or adjusted under 35 U.S.C. 154(b) by 397 days.

(21) Appl. No.: 11/771,398

(22) Filed: Jun. 29, 2007

(65) Prior Publication Data

US 2009/0001062 A1 Jan. 1, 2009

(51) Int. Cl.
B23K 26/10 (2006.01)
(52) U.S. Cl. ............................ 219/121.78
(58) Field of Classification Search ........... 219/121.74, 219/121.78, 121.82, 69.11, 69.17; 700/159–166; 364/474.01, 474.02, 474.08
See application file for complete search history.

(56) References Cited

U.S. PATENT DOCUMENTS

| | | | |
|---|---|---|---|
| 4,870,246 A * | 9/1989 | Bisiach | 219/121.78 |
| 5,053,602 A | 10/1991 | Aharon | |
| 5,109,148 A | 4/1992 | Fujita et al. | |
| 5,574,348 A | 11/1996 | Ehlerding | |
| 6,028,376 A | 2/2000 | Osana et al. | |
| 6,930,275 B2 * | 8/2005 | Yamazaki et al. | 219/121.67 |
| 2004/0025761 A1 | 2/2004 | Sartorio | |
| 2005/0103764 A1 | 5/2005 | Zeygerman | |
| 2008/0116183 A1 * | 5/2008 | Curry | 219/121.75 |

FOREIGN PATENT DOCUMENTS

| | | |
|---|---|---|
| DE | 10010574 | 9/2001 |
| EP | 0209488 | 1/1987 |
| EP | 1 312 441 | 5/2003 |
| EP | 1 557 244 | 7/2005 |
| EP | 1 294 544 | 8/2005 |
| EP | 1 688 807 | 8/2006 |
| EP | 1 708 058 | 10/2006 |
| EP | 1 724 054 | 11/2006 |
| FR | 2677755 | 12/1992 |
| JP | 55012958 | 1/1980 |
| JP | 59050986 | 3/1984 |
| JP | 62068208 | 3/1987 |
| JP | 05057549 | 3/1993 |
| JP | 08309569 | 5/1995 |
| JP | 09239578 | 9/1997 |
| JP | 11145041 | 5/1999 |
| JP | 2002-001629 | 1/2002 |
| WO | WO 2006/035307 | 4/2006 |
| WO | WO 2006/075209 | 7/2006 |
| WO | WO 2006/075209 A2 * | 7/2006 |

OTHER PUBLICATIONS

International Search Report and Written Opinion from corresponding PCT Application PCT/US2008/067443, mailed Oct. 14, 2008, 16 pages.

* cited by examiner

*Primary Examiner*—Tu B Hoang
*Assistant Examiner*—Thien Tran
(74) *Attorney, Agent, or Firm*—Fish & Richardson P.C.

(57) ABSTRACT

Multi-axis laser cutting systems are provided. The cutting systems include a multi-axis, relatively high acceleration drive system, which includes drives that are configured to generate balanced inertial forces. In some implementations, the drives operate according to a polar coordinate systems.

19 Claims, 16 Drawing Sheets

HIGH DYNAMICS LASER PROCESSING MACHINE

TECHNICAL FIELD

This invention relates to multi-axes laser processing machines.

BACKGROUND

A number of commercially available laser processing machines include two separate axis systems, a first axis system for relatively low acceleration movement of the processing head (e.g., laser cutting head) over relatively long distances, and a second axis system for relatively high acceleration movement of the processing head in a relatively restricted space. In some cases, the two axis systems cannot operate simultaneously.

It has been proposed, e.g., in WO 2006/075209, to coordinate the two axis systems. The system disclosed in WO 2006/075209 includes a moving member that moves the processing head over relatively long distances along Cartesian axes (x, y), a pair of slides on the moving member that are configured to move the processing head over relatively short distances along Cartesian axes (u, v), and mobile balancing weights which are operatively associated with the slides. The presence of the mobile balancing weights is said to enable "a drastic reduction in the transmission of undesirable vibrations from the moving member to the supporting structure of the machine." The mobile weights are displaced by their own actuators, separate from the actuators that drive movement of the moving member and slides, in a direction opposite to the direction of movement of the slides. Thus, the proposed laser processing machines include, in addition to the low acceleration axis and high acceleration axis systems, a separate axis system that is required to reduce vibrations during movement of the processing head.

SUMMARY

The present invention features, in one aspect, a laser processing machine having separate low acceleration and high acceleration axis systems which are coordinated with each other. Inertial forces in the high acceleration axis system are balanced without the need for a separate counterbalance drive system. The low acceleration and high acceleration axis systems are capable of operating simultaneously during machine operation.

The X-Y Cartesian coordinates system is used for the low acceleration axes, while the polar coordinates system is used for the high acceleration axes. The use of the polar coordinate system with the high acceleration axes allows the axes to be configured so that inertial forces are balanced at all times during operation, without the need for an independently driven counterbalance system.

In one aspect, the invention features a laser processing machine, comprising: (a) a laser processing head; (b) a multi-axis system, comprising a mounting axis on which the processing head is mounted, the mounting axis including a counterbalance and a drive, and being configured so that the drive moves the counterbalance and the processing head in a manner so that the inertial force generated by movement of the processing head is balanced by the movement of the counterbalance and the mounting axis is substantially continuously balanced during operation; and (c) a long travel system, on which the multi-axis system is mounted for coordinated movement. The multi-axis system is configured to move the processing head over relatively shorter distances and at relatively higher acceleration than the long travel drive system.

Some implementations may include one or more of the following features. The multi-axis system is a polar coordinate system defining an R-axis and a W-axis. The mounting axis is the R-axis is of the polar coordinate system. The W-axis of the multi-axis system comprises a disc and two drive motors on opposite sales of the disc, the inertial forces of the drive motors being substantially balanced. The long travel drive system is a Cartesian coordinate system. The multi-axis drive system and long travel drive system are configured for simultaneous movement. The mounting axis comprises a pair of ball screw transmissions driven by the drive to move the counterbalance and processing head in opposite directions at substantially the same speed. The R-axis is mounted on the W-axis. The machine bather includes a Z-axis configured to provide vertical movement of the processing head. The multi-axis system is configured so that the Z-axis will be stationary during movement of the R-axis and W-axis.

In another aspect, the invention features a laser processing machine, comprising: (a) a laser processing head; (b) a multi-axis polar coordinate system comprising an R-axis and a W-axis, one of the axes being a mounting axis on which the processing head is mounted, the mounting axis being configured so that the mounting axis is substantially continuously balanced during operation; and (e) a long travel system, on which the multi-axis system is mounted for coordinated movement. The multi-axis system is configured to move the processing head over relatively shorter distances and at relatively higher acceleration than the long travel drive system.

Some implementations may include one or more of the following features. The mounting axis is the R-axis of the polar coordinate system. The W-axis of the multi-axis system comprises a disc and two drive motors on opposite sides of the disc, the inertial forces of the drive motors being substantially balanced. The long travel drive system is a Cartesian coordinate system. The multi-axis drive system and long travel drive system are configured for simultaneous movement. The mounting axis comprises a counterbalance and a pair of ball screw transmissions driven by a single drive to move the counterbalance and the processing head in opposite directions at substantially the same speed. The R-axis is mounted on the W-axis. The machine further includes a Z-axis configured to provide vertical movement of the processing head. The multi-axis system is configured so that the Z-axis will be stationary during movement of the R-axis and W-axis.

The invention also features, in another aspect, a method of processing a workpiece comprising; (a) using a multi-axis system to move a processing head relatively short distances during operation of the processing head, the multi-axis system comprising a mounting axis on which a processing head is mounted, the mounting axis including a counterbalance and a drive, and being configured so that the drive moves the counterbalance and the processing head in a manner so that the inertial force generated by movement of the processing head is balanced by the movement of the counterbalance and the mounting axis is substantially continuously balanced during operation; and (b) using a long travel system, on which the multi-axis system is mounted for coordinated movement, to move the processing head relatively longer distances during operation of the processing head.

In yet a further aspect, the invention features a method of processing a workpiece comprising: (a) using a multi-axis polar coordinate system to move a processing head relatively short distances during operation of the processing head, the multi-axis system comprising a mounting axis configured so that the mounting axis is substantially continuously balanced during operation; and (b) using a long travel system, on which the multi-axis system is mounted for coordinated movement, to move the processing head relatively longer distances during operation of the processing head.

The details of one or more embodiments of the invention are set forth in the accompanying drawings and the description below. Other features and advantages of the invention will be apparent from the description and drawings, and from the claims.

DETAILED DESCRIPTION

Overview

Figure 1:
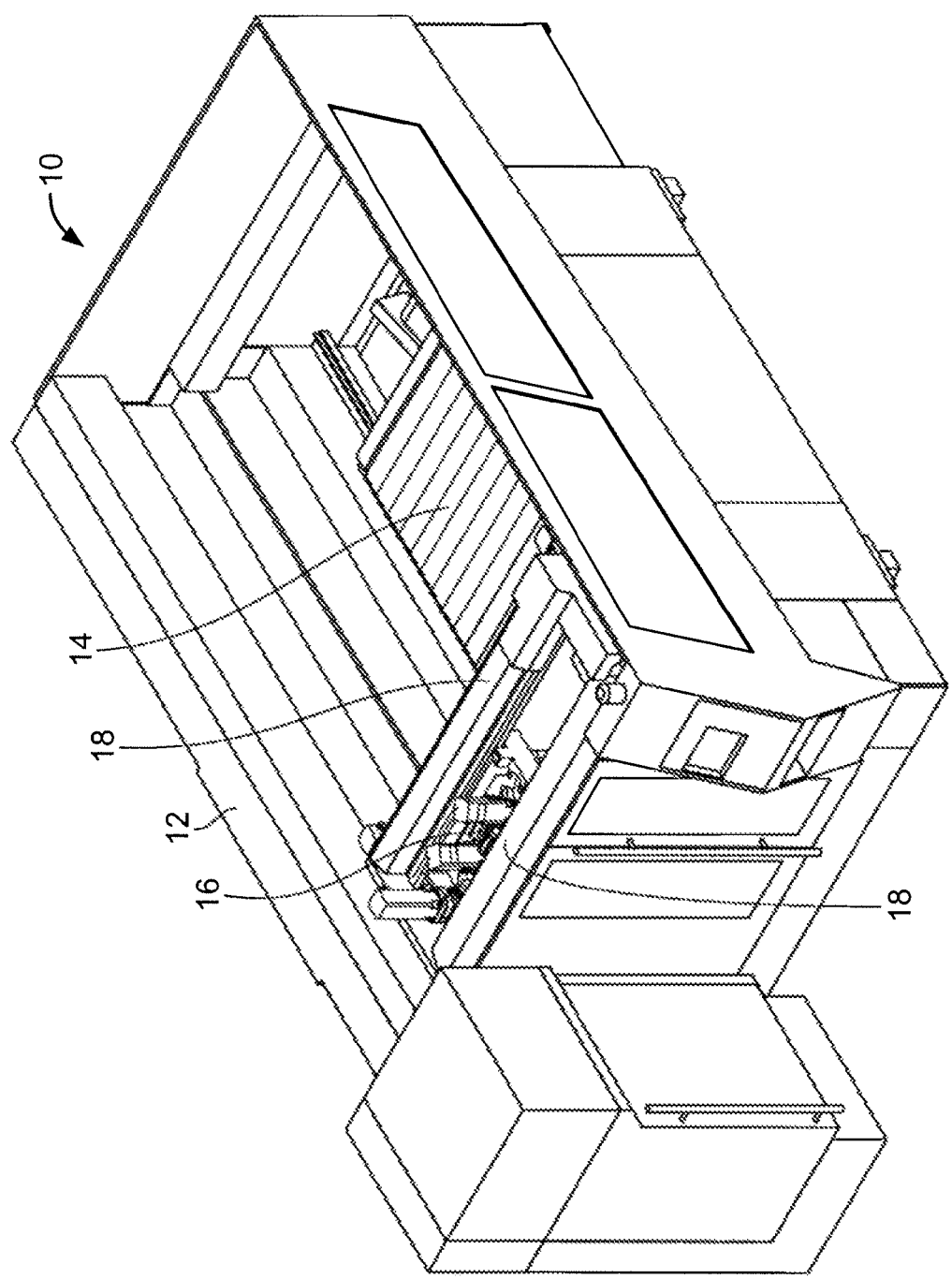
FIG. 1 is a perspective view of a laser cutting machine.
Figure 2:
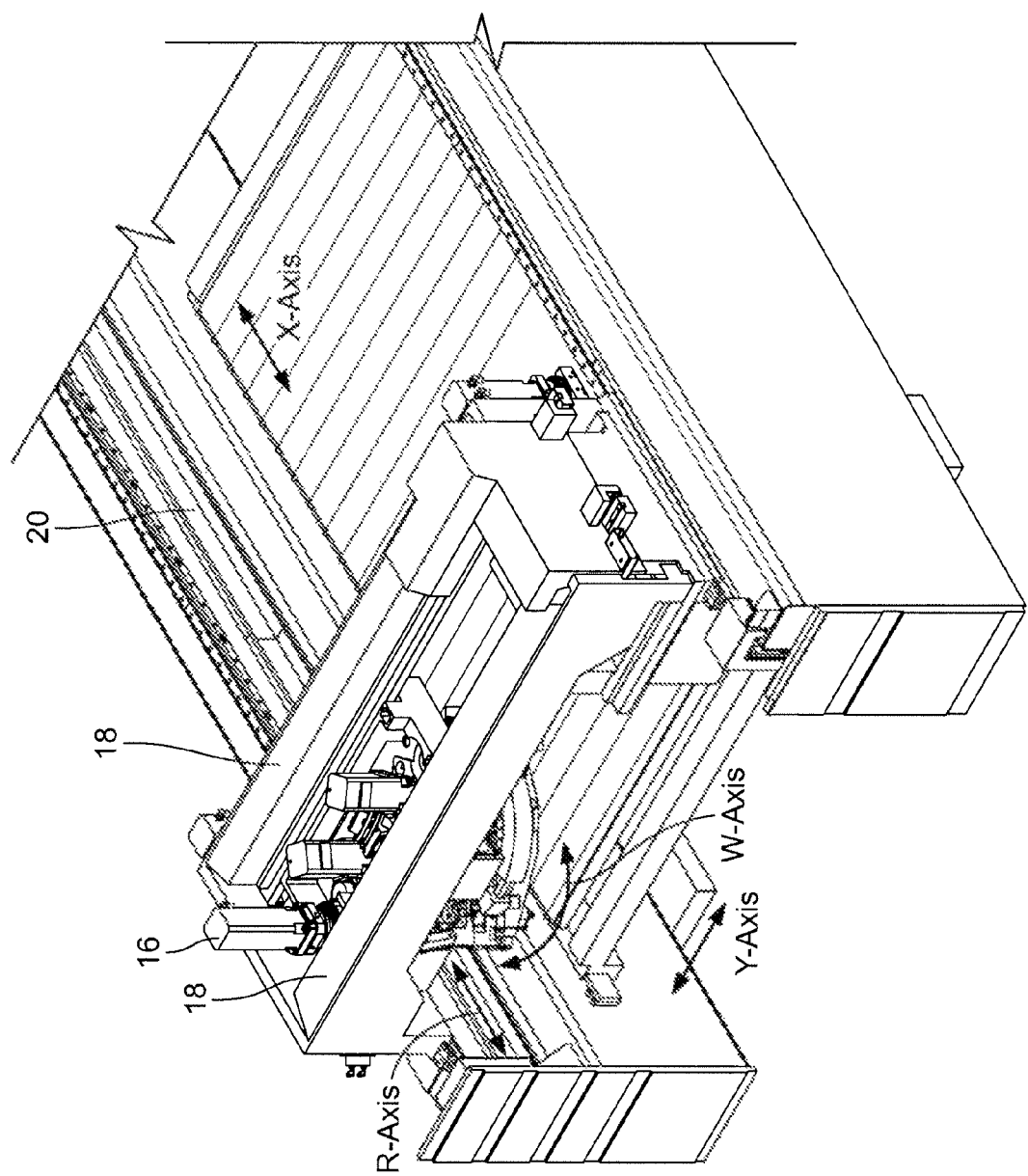
FIG. 2 is a perspective view diagrammatically indicating the multi-axis systems of the cutting machine of FIG. 1.
Figure 3:
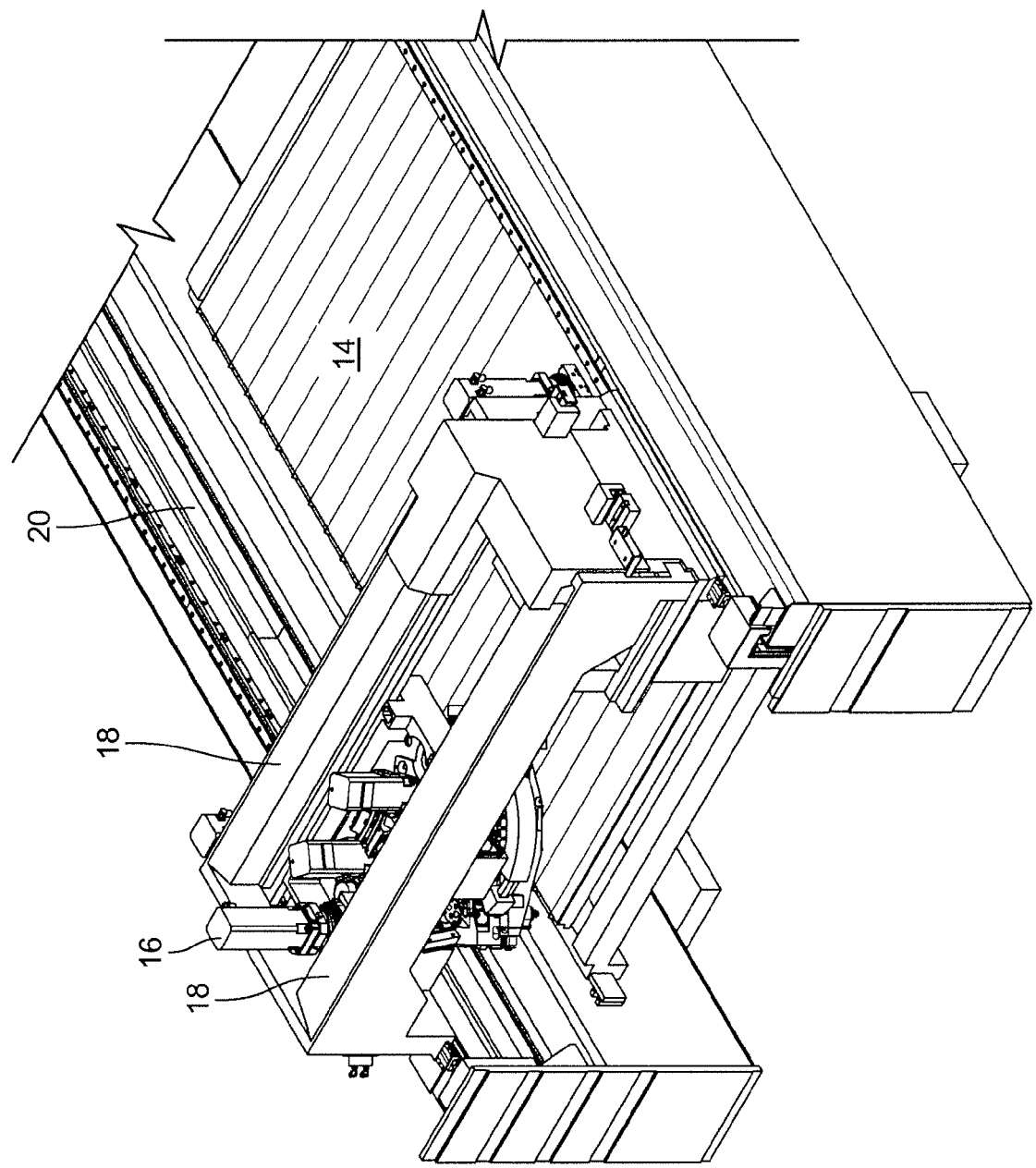
FIG. 3 is a diagrammatic view showing the path of a laser beam through the axis system shown in FIG. 2

Referring to FIGS. 1-3, a laser cutting machine 10 includes an enclosure 12, a workpiece support 14, a multi-axis system 16 configured to move in a polar (R-W) coordinate system, and a laser cutting head (not shown in FIGS. 1-3) mounted on the multi-axis system. The multi-axis system is configured to move the cutting head over small distances with very high acceleration. As illustrated in FIG. 2, the multi-axis system 16 moves, as a whole, with low acceleration, large scale movements on an x-y Cartesian coordinate system. Movement of the multi-axis system on the x-y Cartesian coordinate system is coordinated with, and can proceed simultaneously with, movement in the R-W polar coordinate system. For example, the multi-axis system 16 may be mounted to move in the Y direction on rails 18, which are in turn movable in the X direction along rails 20, as shown. This x-y axis system is conventional, and will not be discussed herein.

The multi-axis system 16 provides high acceleration, movement over small distances using a polar coordinate system. System coordinates are a radial coordinate R that represents the radial distance from a pole 0, and an angular coordinate W that represents the counter-clockwise angle from the a 0° ray referred to as the polar axis. The multi-axis system includes an R-axis which moves the laser cutting head to a desired radial (R) coordinate, and a W-axis which moves the laser cutting head to a desired angular (W) coordinate. The multi-axis system also allows the cutting head to be moved vertically (raised or lowered relative to the workpiece), in the Z direction. Thus, the multi-axis system 16 includes an R-axis, a W-axis, and a Z-axis that are assembled into a single unit to provide coordinated movement in all three dimensions. Details of these drives and their operation will be discussed below.

In preferred implementations, the R-W axes have a travel of at least about 75 mm, preferably at least about 100 mm in the R direction, and an angular range of at least about 75°, preferably at least about 85°, e.g., 88°. Preferably, the speed of the R-W axes is at least about 100 m/min, more preferably at least about 120 m/min, and the acceleration is at least about 30 m/s$^2$ and more preferably at least about 50 m/s$^2$.

The laser beam path through the multi-axis system, which also will be discussed in more detail below, is shown diagrammatically in FIG. 3.

In preferred implementations, as many components as possible are mounted on the Y axis housing, so that the R and W axes are as light as possible, allowing optimal acceleration and velocity of the R-W axes. In some implementations, the R-axis components weigh less than about 40 kg, preferably less than about 30 kg, while the R-axis components and W-axis components combined weigh less than about 100 kg, preferably less than about 90 kg. Preferably, the R, W and Z axes combined weigh less than about 130 kg, more preferably less than about 110 kg.

Assembled Multi-Axis Unit

We will first briefly discuss the assembled multi-axis unit, and then will discuss the components of each of the R-axis, W-axis and Z-axis in detail.

Figure 9:
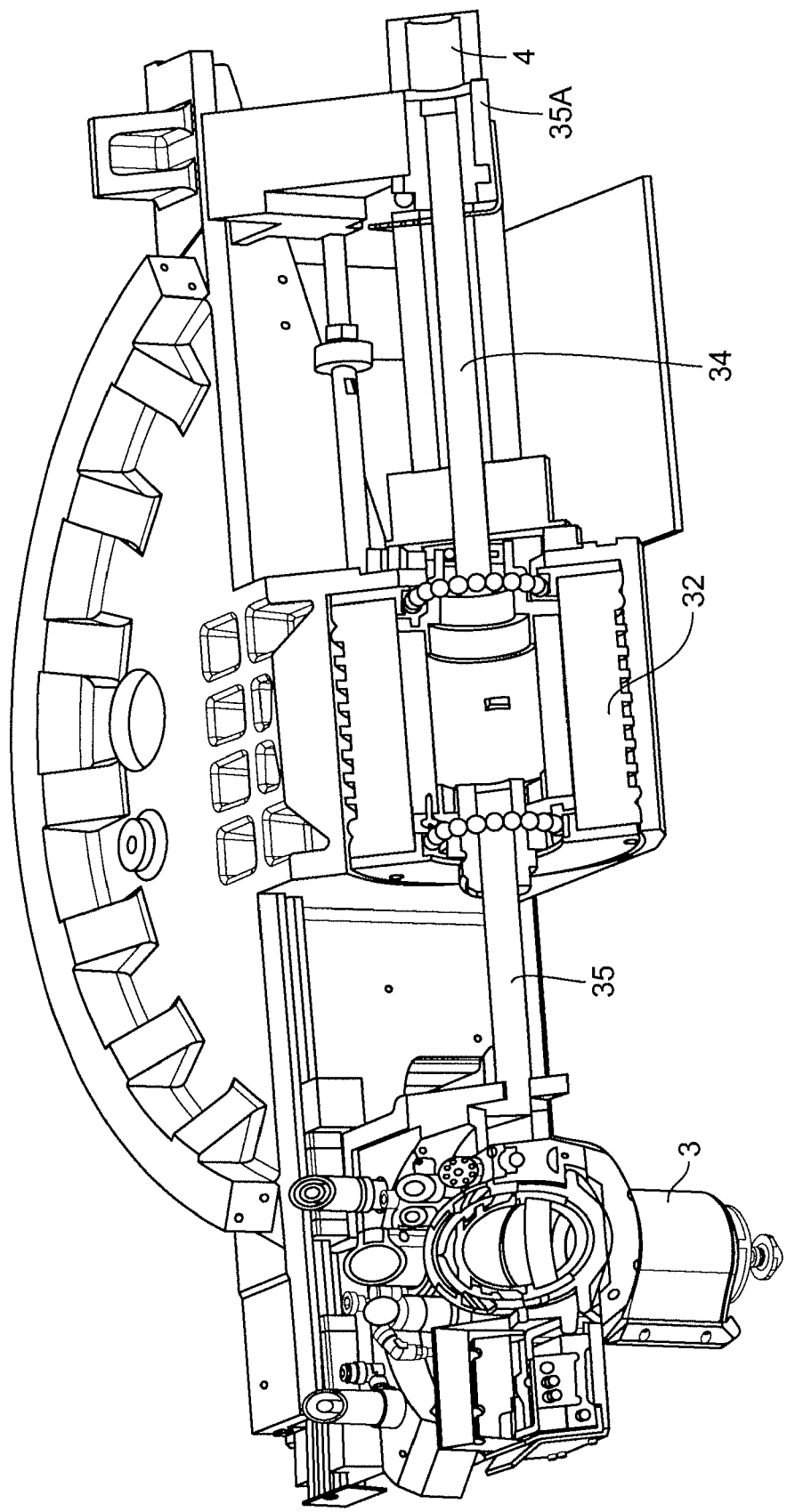
FIG. 9 is a partially cut-away view showing the torque motor and transmission of the R-axis.

Referring to FIG. 9, the R-axis 140 moves using a ball screw transmission, as will be discussed below. The laser cutting bead 3 is mounted on the end of the ball screw 34, and the counter balance 4 is mounted on the nut 35A of ball screw 35. The R-axis moves the cutting head 3 and a counter balance 4 in opposite directions, so radial inertial forces are balanced. Balancing of the inertial forces reduces or eliminates the tendency of the system to vibrate during operation.

Figure 10:
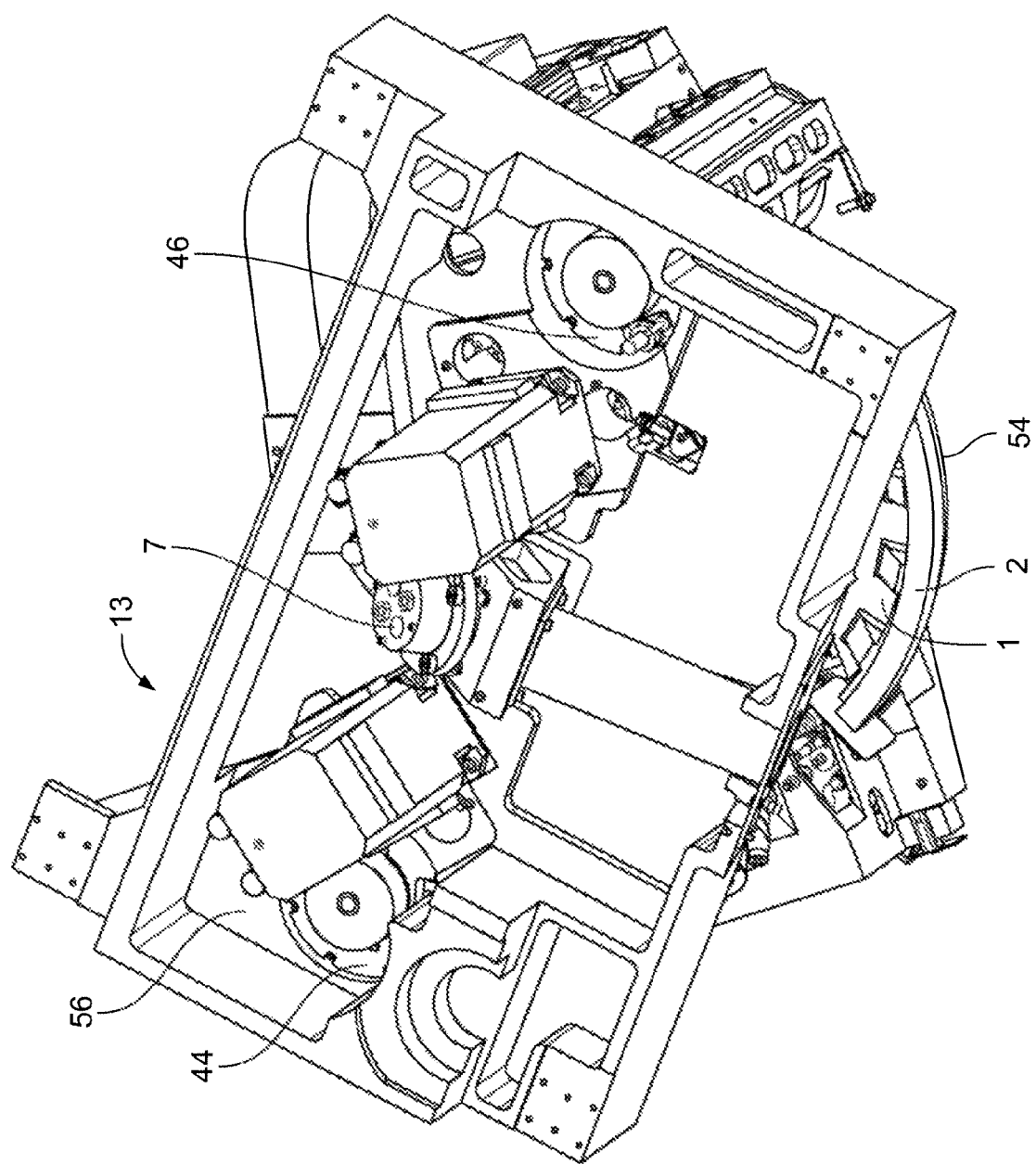
FIG. 10 is a perspective view of a portion of the W-axis (prior to assembly of all components).
Figure 10A:
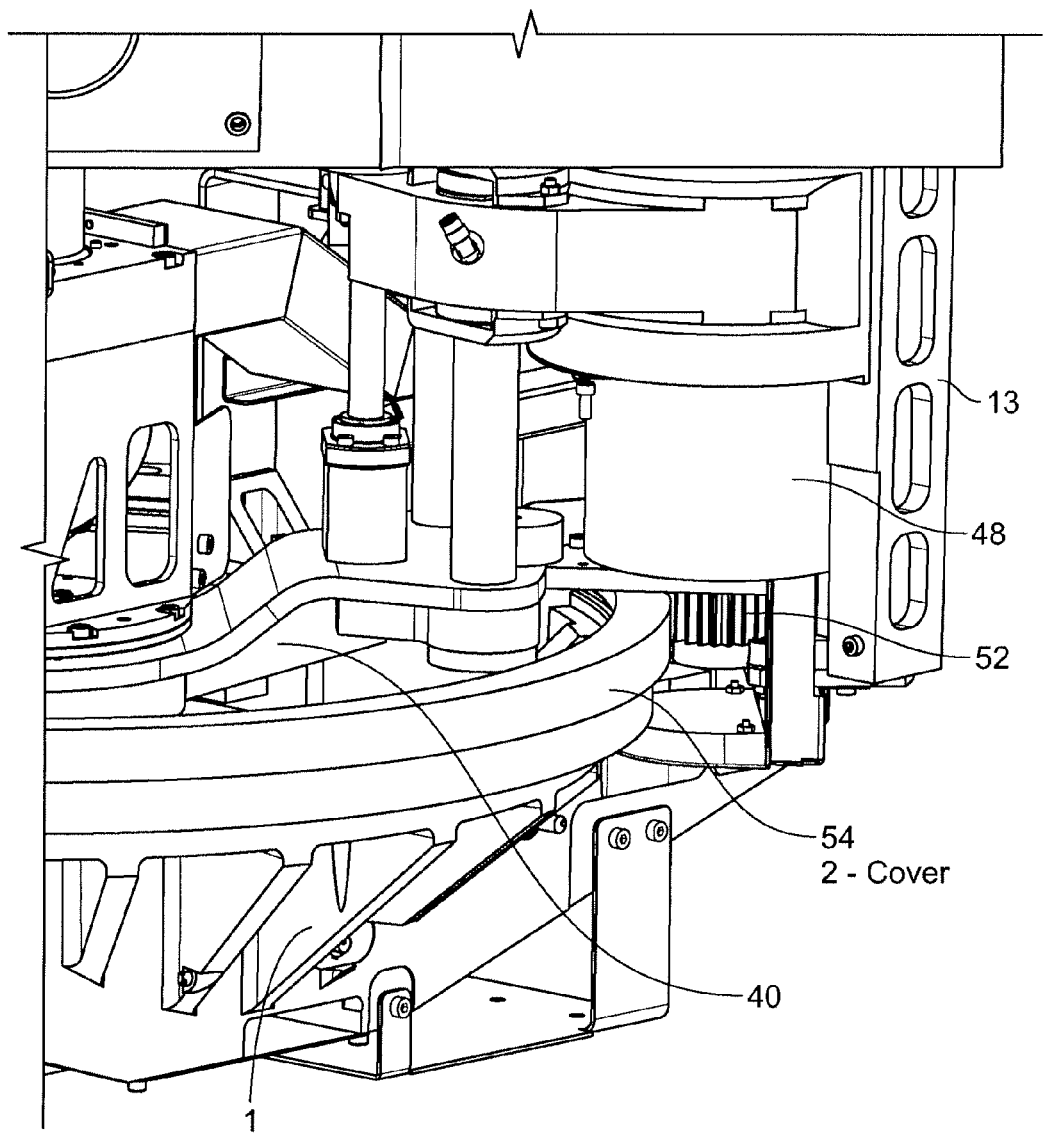
FIG. 10A is a detailed view of the transmission of the W-axis.

Referring to FIGS. 10, 10A the W-axis drives are mounted on Y-axis housing 13, and rotate the W axis through arcuate gear segments 2. As will be discussed below, the W-axis drives produce equal inertial forces having opposite directions. Thus, the forces on the W-axis are balanced, and thus the W-axis does not contribute to vibration of the multi-axis system.

Figure 7:
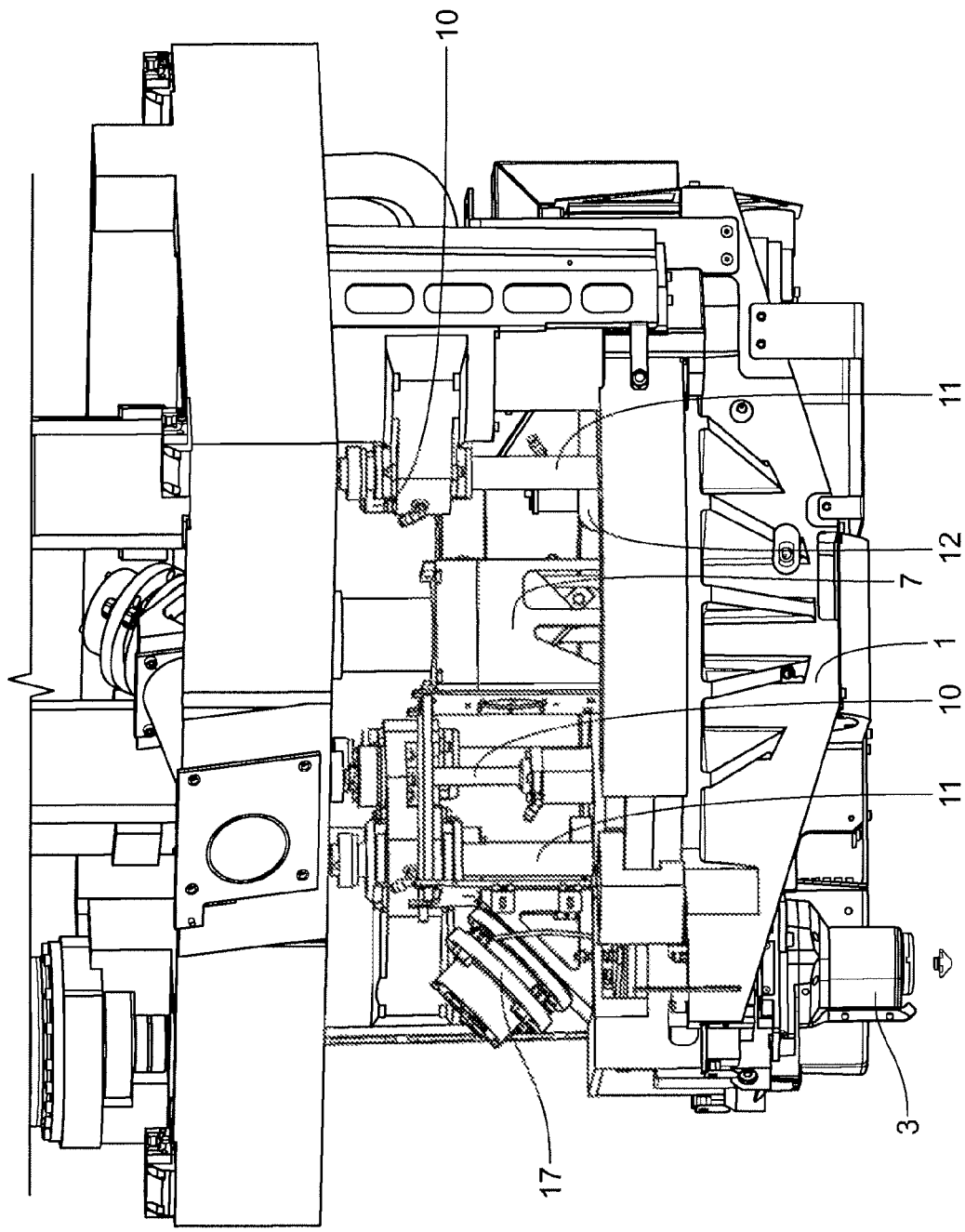

A central bending mirror 7 (FIG. 7) is installed on the W-axis housing 1 and rotates with it, always directing the laser beam towards an autolas mirror 17 (FIG. 7). As a result, the laser beam will follow the path of the W-axis and thus the cutting head.

The R-axis 140 is installed in the W-axis housing 1 and rotates with rotation of the W-axis.

Figure 4:
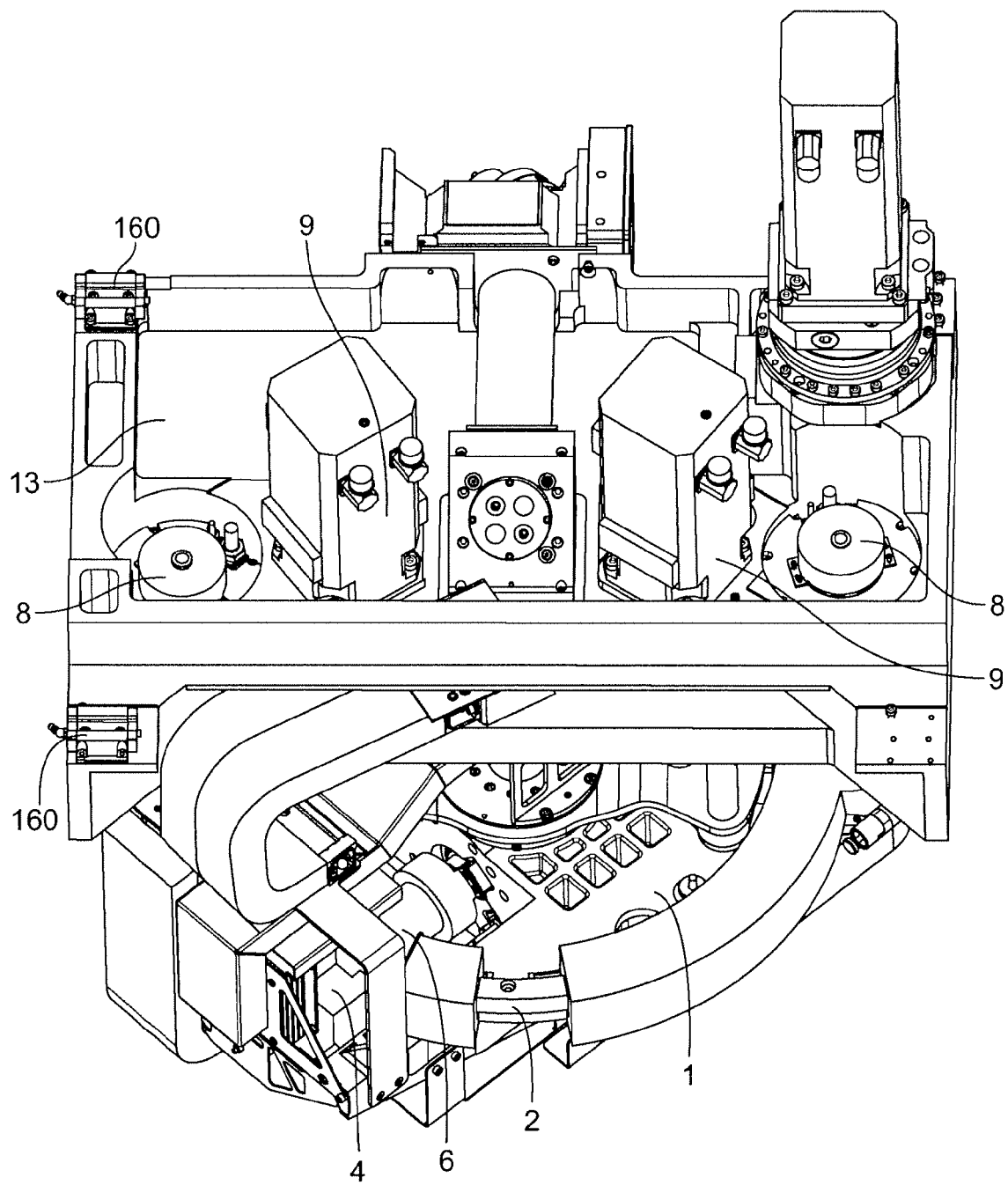
FIGS. 4-6 are perspective views and FIG. 7 is a side view of a multi-axis system.
Figure 5:
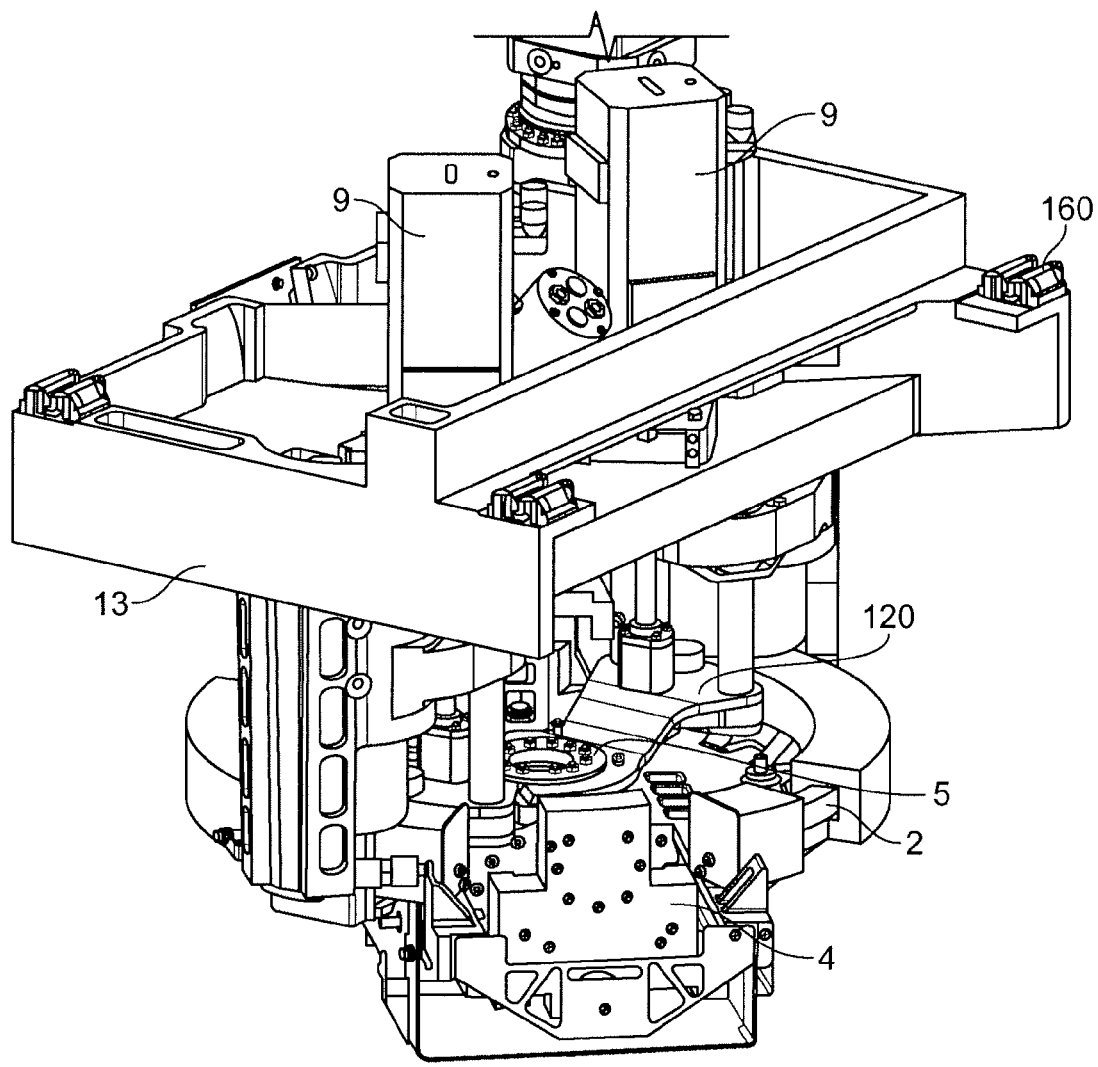
Figure 6:
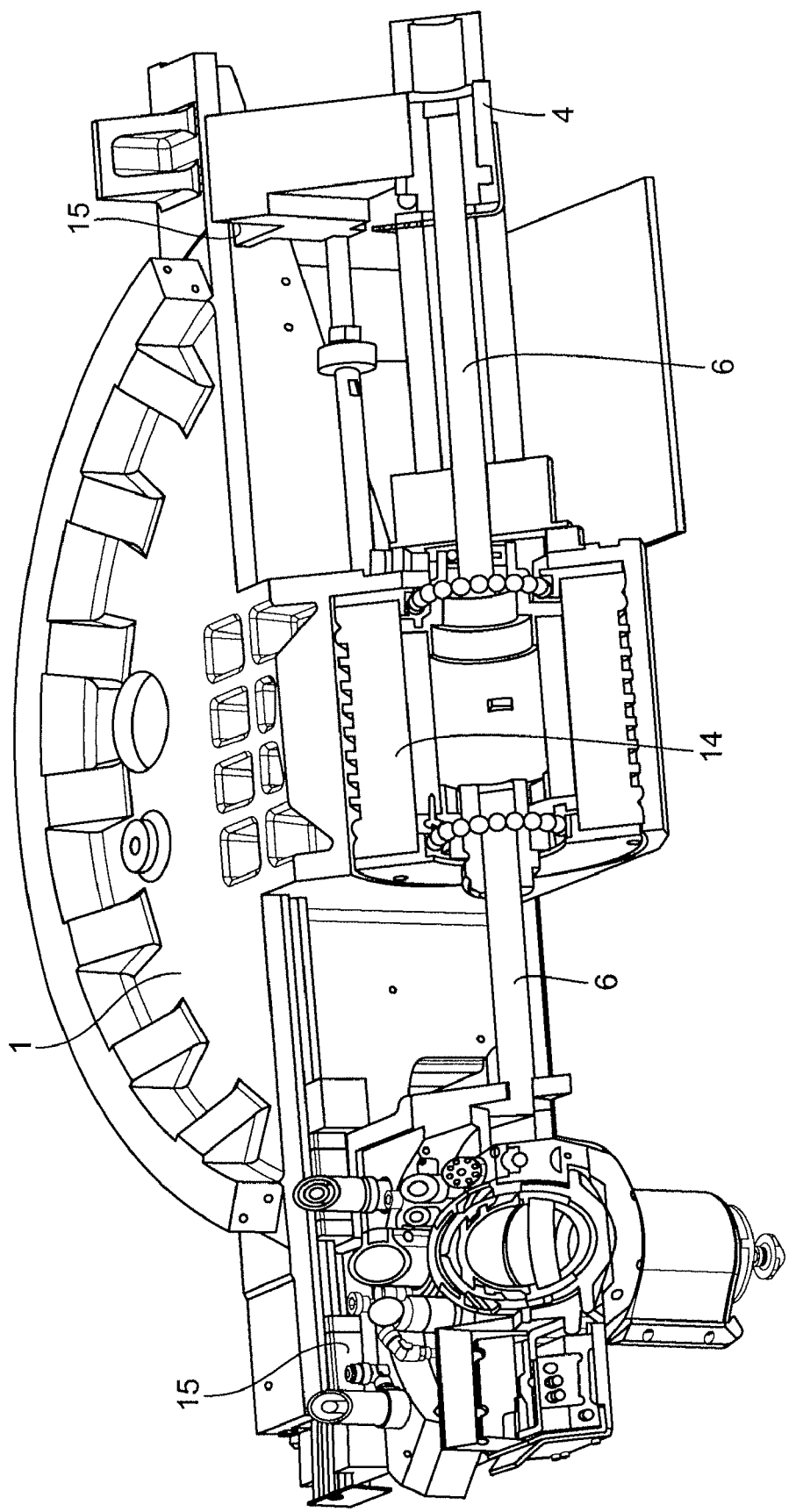

Referring to FIG. 7, the Z-axis is driven by drives 9 through ball screws 10 (FIG. 7). The Z-axis is guided by four guides 11 on plate 12. The Z-axis and the entire multi-axis system 16 is mounted on the Y axis carriage 160 (FIG. 4), thus allowing coordinated simultaneous movement in the R-W and x-y axes.

R-Axis Components

As discussed above, the R-axis 140 is configured to provide linear movement of the cutting head to a given radial coordinate.

Figure 8:
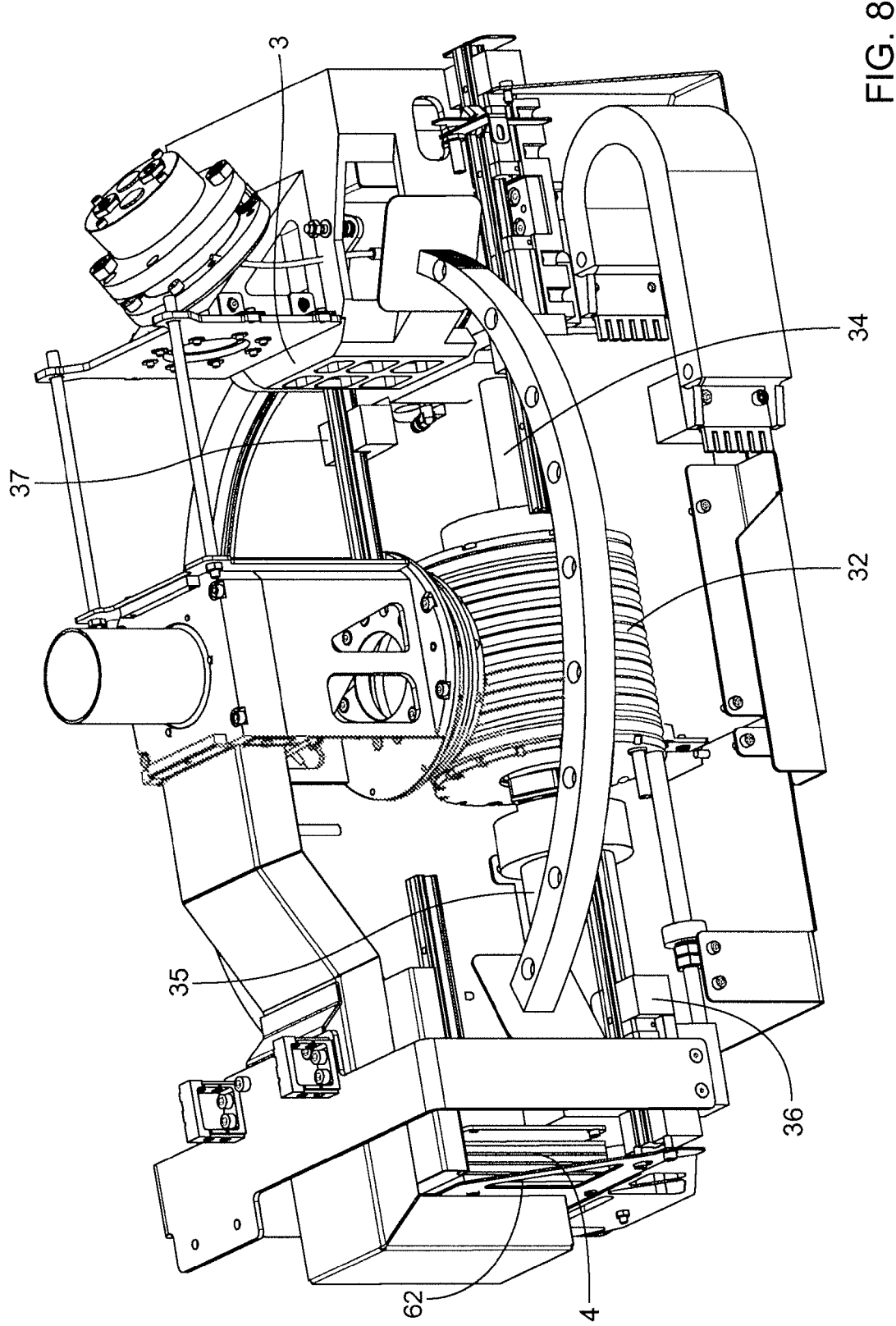
FIG. 8 is a perspective view of the R-axis of the multi-axis system.

Receiving to FIGS. 8, 9, the R-axis 140 includes a torque motor 32 which rotates a ball nut 34A and ball screw 35. As shown in detail in FIG. 9, the hall screw 34 moves through the torque motor 32. The cutting head 3 is connected to the outside end of the ball screw 34. The counterbalance 4, which is equal in weight to the cutting head 3, is mounted to the nut 35a which moves along hall screw 35.

During operation, the cutting head 3 and counterbalance 4 move along the ball screws 34 and 35 in opposite directions at the same speed to balance inertial forces. The cutting head 3 and counterbalance 4 are driven, through the ball screws 34, 35 by the same motor (torque motor 32). Because the cutting head and counterbalance are driven by the same motor, inertial forces are always in balance when the cutting head is in motion, without the need to activate a separate motor or separate counterbalancing mechanism.

The R-axis drive 140 further includes a pair of mechanical stops 36 and 37 (FIG. 8) provided for safety and a rotary encoder 38, provided for positioning and motor control. If desired, the cutting head 3 may be mounted on the R-axis by an automated coupling device such as those that are well known in the machine installation art.

W-Axis Components

Figure 10B:
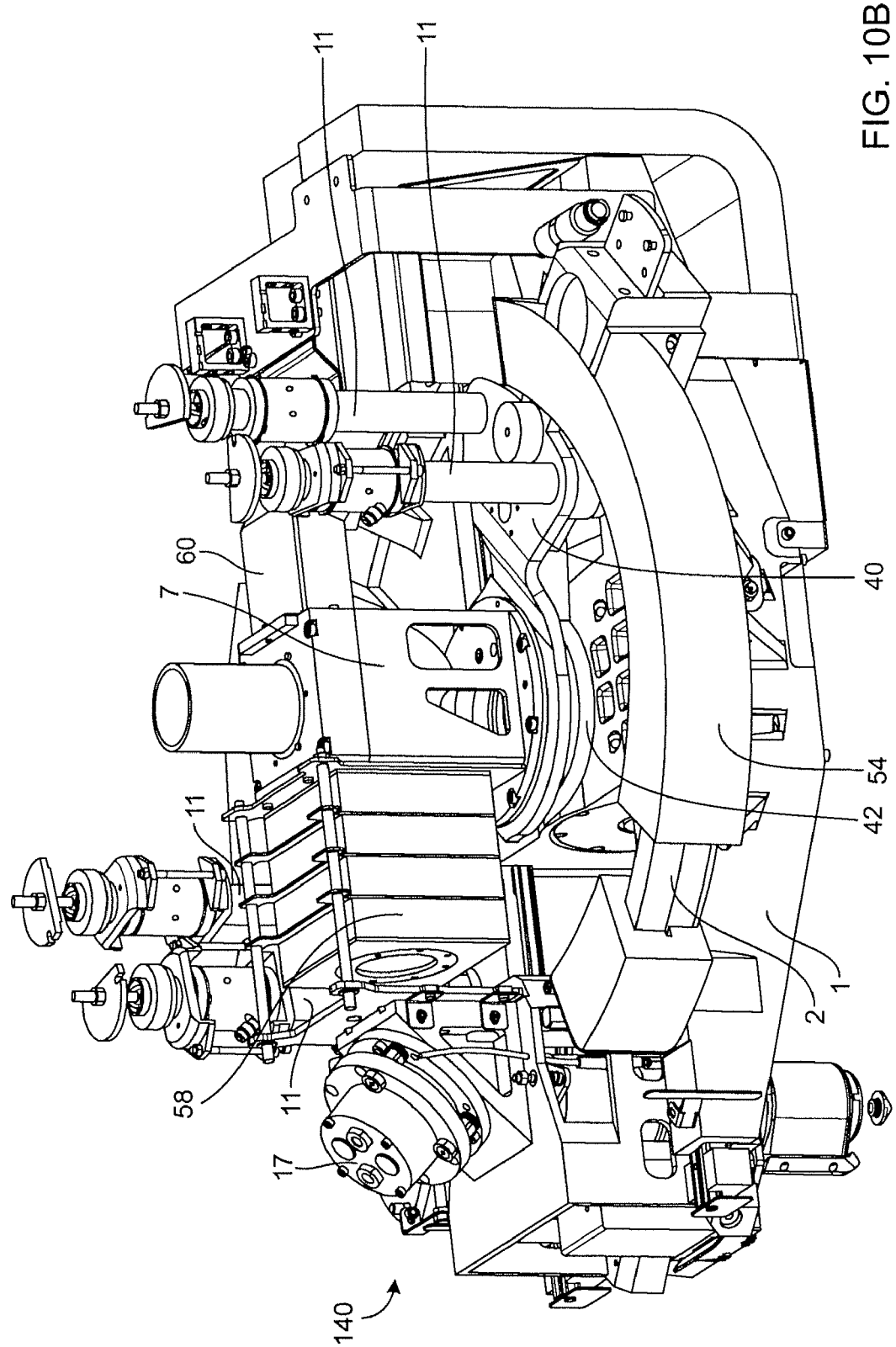
FIG. 10B is a perspective view of the assembled W-axis and R-axis.

The W-axis is configured to provide rotational movement of the cutting head, to a given angular coordinate. Referring to FIGS. 10 and 10B, the W-axis includes a rotatable W-axis housing 1, and, mounted on the W-axis housing 1, the R-axis 140. Thus, the R-axis 140 rotates with the W-axis. The W-axis housing 1 rotates about a center bearing 42, resulting in smooth rotational movement of the cutting head.

Two torque motors 44, 46 (FIG. 10) are provided for driving a transmission 48 that rotates the W-axis housing 1. Referring to FIG. 10A, the transmission 48 (FIG. 10A) includes a pinion 52 and an arcuate rack 54. The arcuate rack 54 is made up of the arcuate gear segments 2, discussed above, which are engaged by the pinions. The torque motors are mounted on opposite sides of the Y-axis housing, and the inertial forces created by the two motors are equal and opposite, so that the inertial forces balance each other. A rotary encoder 50 is provided to control the motors.

Because the motors are mounted on a Y-axis housing 13, the amount of weight that is being rotated is reduced, allowing higher acceleration of the W-R axes.

As discussed above, a central bending mirror 7 (FIGS. 7, 10B) is installed on the W-axis housing 1 and rotates with it, so that the laser beam is always directed towards a TRUMPF Autolas mirror 17 that then directs it to the cutting head 3 (FIG. 7). The minor 7 is connected to a beam bellow 58 and to a gas channel 60, to enclose a path for the laser beam. Another beam bellow 62 is connected to the opposite side of the gas channel 60. The beam bellow 58 is connected to the cutting head, while the beam bellow 62 is connected to the counterbalance 4 in a manner so that as the cutting head 3 and counterbalance 4 move one of the bellows is compressed while the other is extended. This prevents the gas in the beam path from being compressed, and prevents a vacuum from being created (see FIG. 10B).

Z-axis guides 11 (FIGS. 10B, 7) are provided, to guide vertical movement of the R and W axes by the Z-axis drives 9. These guides are mounted to plate 12 (FIG. 7) which in turn is connected to W axis housing through central bearing 43 thus when the W axis rotates the guides 11 remain stationary. The Y axis housing 13 includes a mechanical stop 66 for the W-axis for safety.

Z-Axis Components

Figure 11:
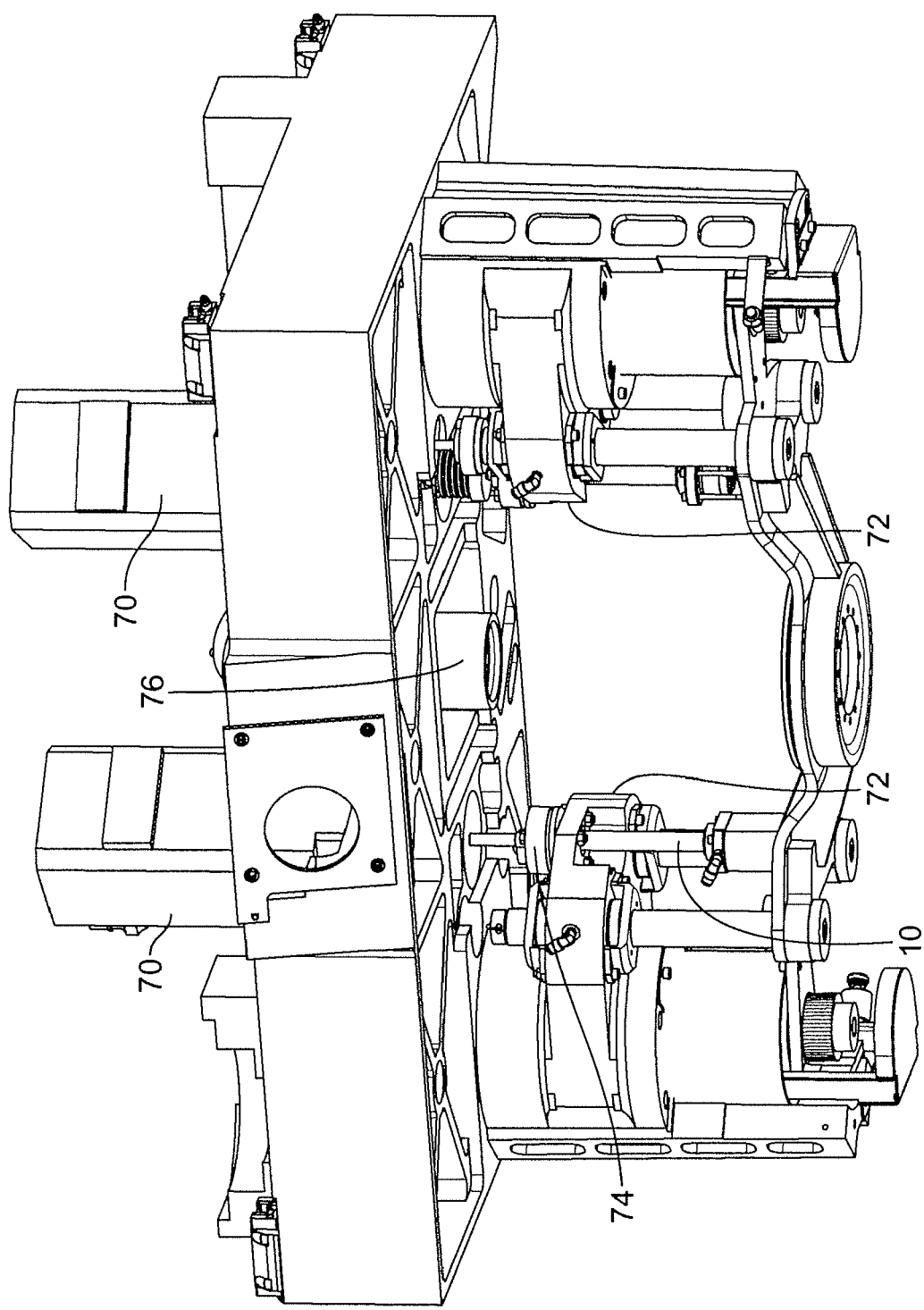
FIGS. 11 and 12 are perspective views of the Z-axis of the multi-axis system, taken from different positions.
Figure 12:
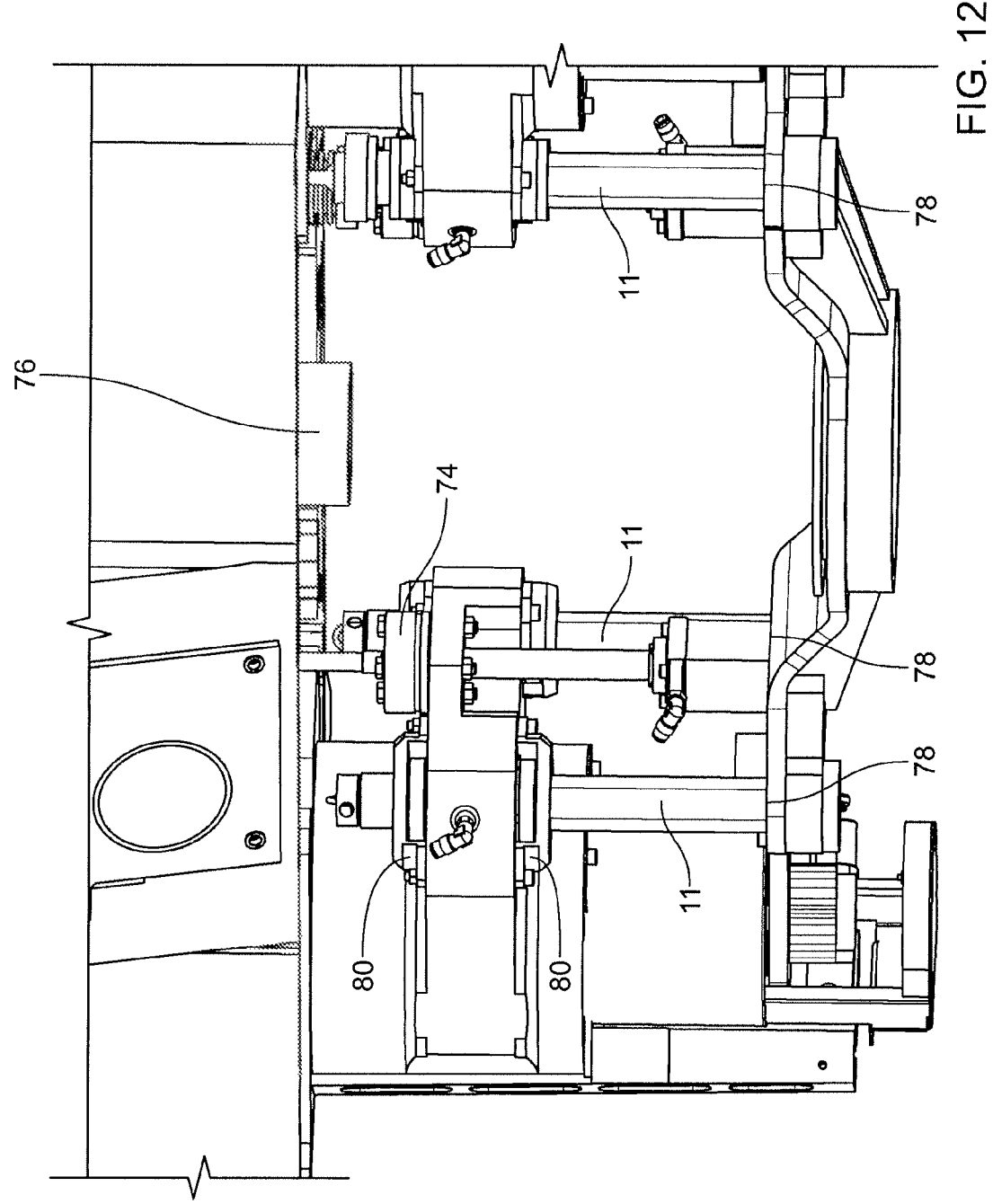
Figure 13:
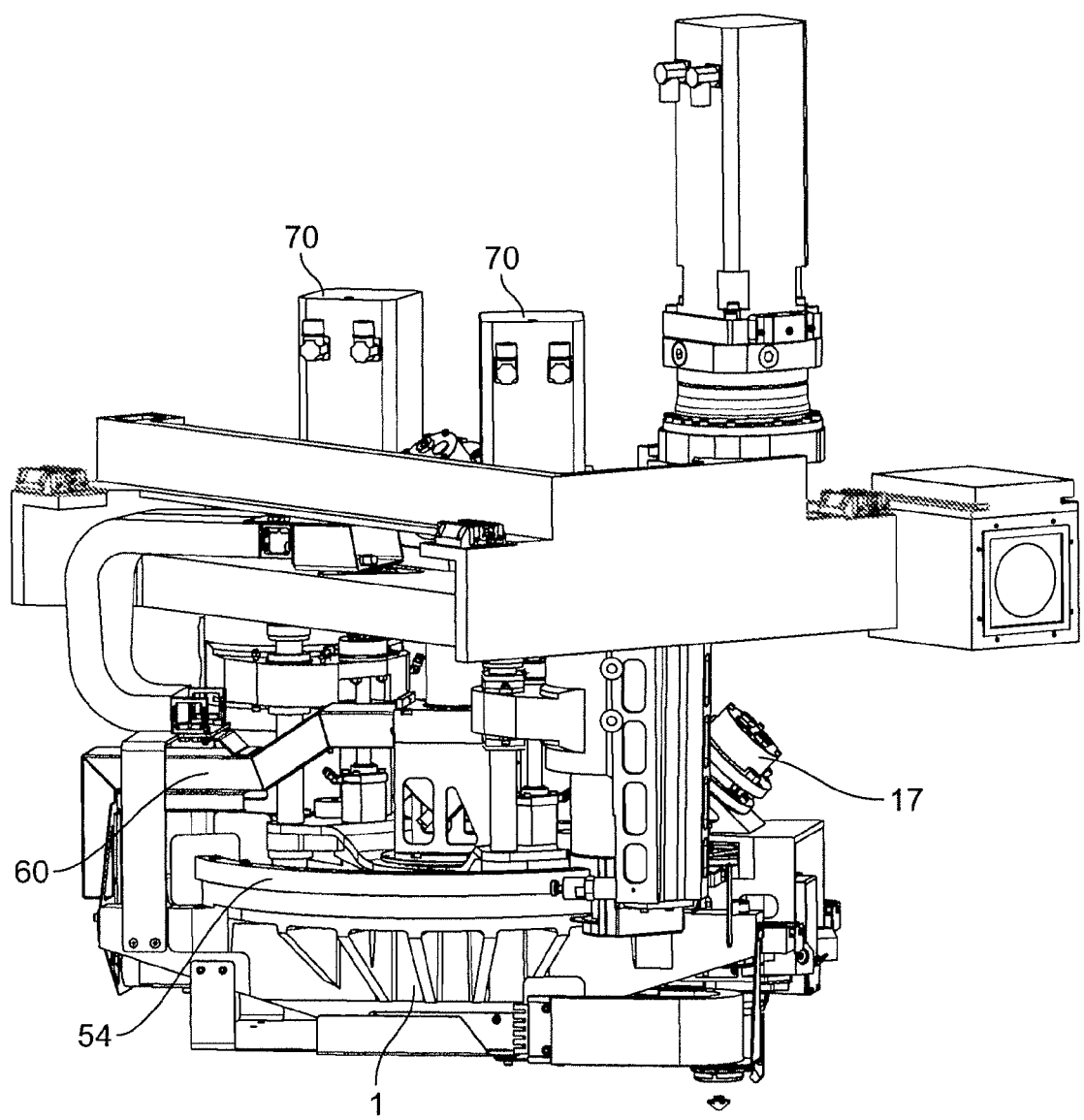
FIGS. 13 and 14 are perspective views showing the Z-axis assembled with the R-axis and W-axis.

Referring to FIG. 11, the Z-axis 9 includes two motors 70, each of which drives a ball screw transmission 72 that includes ball screws 10 (FIG. 7) and ball screw support bearings 74. Movement is guided by the Z-axis guides 11, as discussed above. Part of the weight of the multi-axis drive system and cutting head is counterbalanced by counterbalance springs 78 (FIG. 12) which are built into the Z-axis guides. Z-shaft scrapers 80 remove contamination from Z-axis guides 11.

It is not necessary to counterbalance the inertial forces of the motors 70, because the cutting head does not move in the Z-direction during cutting operation.

Figure 14:
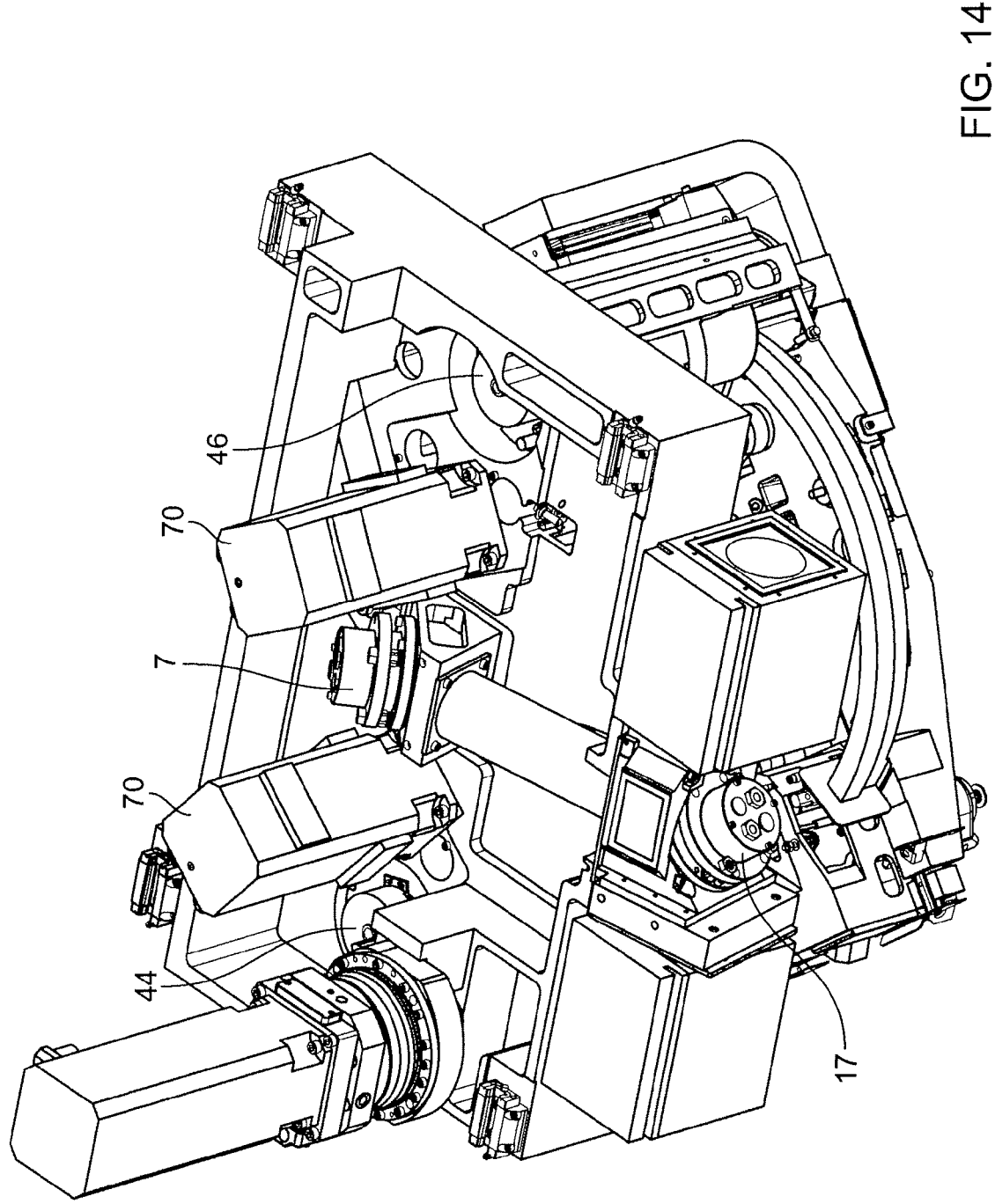

Referring to FIGS. 11 and 14, the laser beam passes through the Z-axis, from the center mirror 7A installed on the Y-axis housing to Z beam tube 76, center bending mirror 7 and Autolas mirror 17, discussed above and thus to the cutting head.

Other Embodiments

A number of embodiments of the invention have been described. Nevertheless, it will be understood that various modifications may be made without departing from the spirit and scope of the invention.

For example, while a laser cutting head has been described above, other types of laser processing heads may be used, and the laser processing machine may be used for other types of workpiece processing such as laser welding.

Accordingly, other embodiments are within the scope of the following claims.

What is claimed is:

1. A laser processing machine, comprising: a long travel system; a multi-axis system mounted on the long travel system for coordinated movement; and a laser processing head mounted on the multi-axis system;
   wherein the multi-axis system is a polar coordinate system defining an R-axis and a W-axis and is configured to move the processing head over relatively shorter distances and at relatively higher acceleration than the long travel drive system;
   wherein the processing head is mounted on the R-axis of the multi-axis system, the R-axis including a counterbalance and a drive configured to simultaneously move the counterbalance and the processing head in a manner such that the inertial force generated by R-axis movement of the processing head is balanced by an opposite R-axis movement of the counter balance; and
   wherein the W-axis of the multi-axis system defines a rotational center disposed between the processing head and the counterbalance.

2. The laser processing machine of claim 1 wherein the W-axis of the multi-axis system comprises a W-axis housing and a transmission that rotates the W-axis housing about the rotational center, the transmission being driven by two drive motors engaging the transmission on opposite sides of the rotational center of the W-axis, such that inertial forces created by the drive motors are substantially balanced during W-axis rotation.

3. The laser processing machine of claim 1 wherein the long travel drive system is a Cartesian coordinate system.

4. The laser processing machine of claim 1 wherein the multi-axis drive system and long travel drive system are configured for simultaneous movement.

5. The laser processing machine of claim 1 wherein the R axis comprises a pair of ball screw transmissions driven by a common drive motor to move the counterbalance and processing head in opposite directions at substantially the same speed.

6. The laser processing machine of claim 2 wherein the R-axis is mounted on the W-axis, such that the R-axis rotates with rotation of the W-axis.

7. The laser processing machine of claim 1 further comprising a Z-axis configured to provide vertical movement of the processing head.

8. The laser processing machine of claim 7 wherein the multi-axis system is configured so that the Z-axis remains stationary during movement of the R-axis and W-axis.

9. A laser processing machine, comprising:
   a long travel system;
   a multi-axis system mounted on the long travel system for coordinated movement; and
   a laser processing head mounted on the multi-axis system;
   wherein the multi-axis system is a polar coordinate system comprising an R-axis and a W-axis and is configured to move the processing head over relatively shorter distances and at relatively higher acceleration than the long travel drive system;
   wherein the W-axis of the multi-axis system defines a rotational center and comprises a W-axis housing and a transmission that rotates the W-axis housing about the rotational center, the transmission being driven by two drive motors engaging the transmission on opposite sides of the rotational center, such that inertial forces created by the drive motors are substantially balanced during W-axis rotation.

10. The laser processing machine of claim 9 wherein the long travel drive system is a Cartesian coordinate system.

11. The laser processing machine of claim 9 wherein the multi-axis drive system and long travel drive system are configured for simultaneous movement.

12. The laser processing machine of claim 9 wherein the R axis comprises a counterbalance and a pair of ball screw transmissions driven by a single drive to move the counterbalance and the processing head in opposite directions at substantially the same speed.

13. The laser processing machine of claim 9 wherein the R-axis is mounted on the W-axis, such that the R-axis rotates with rotation of the W-axis.

14. The laser processing machine of claim 9 further comprising a Z-axis configured to provide vertical movement of the processing head.

15. The laser processing machine of claim 14 wherein the multi-axis system is configured so that the Z-axis remains stationary during movement of the R-axis and W-axis.

16. A method of processing a workpiece, the method comprising:
   using a long travel system to move a processing head relatively long distances during operation of the processing head to process a workpiece; and
   using a polar coordinate multi-axis system, mounted on the long travel system for coordinated movement and defining an R-axis and a W-axis, to move the processing head relatively short distances during operation of the processing head;
   wherein moving the processing head using the multi-axis system comprises driving the R-axis to provide linear movement of the processing head to a given radial coordinate, and driving the W-axis to provide rotational movement of the processing head to a given angular coordinate; and
   wherein driving the W-axis comprises rotating the W-axis about a rotational center with two drive motors engaging the W-axis on opposite sides of the rotational center, such that inertial forces created by the drive motors are substantially balanced during W-axis rotation.

17. The method of claim 16, wherein driving the R-axis comprises simultaneously moving a counterbalance and the processing head in a manner such that the inertial force generated by R-axis movement of the processing head is balanced by an opposite R-axis movement of the counterbalance.

18. The laser processing machine of claim 1 wherein the W-axis further comprises a central bending mirror mounted at the rotational center, such that the mirror rotates with the W-axis to deflect a processing beam to the processing head.

19. The laser processing machine of claim 18 wherein the mirror is disposed within a gas channel, the machine further comprising
   a first bellow connecting the gas channel to an inner end of the processing head; and
   a second bellow connecting the gas channel to an outer end of the counterbalance, such that movement of the R-axis causes one of the first and second bellows to be compressed while the other of the first and second bellows is extended.

\* \* \* \* \*